United States Patent [19]

Ward et al.

[11] Patent Number: 5,383,823
[45] Date of Patent: Jan. 24, 1995

[54] CLUTCH CONTROL

[75] Inventors: Harold R. Ward, Farmington Hills; Jerry D. Woods, Milford; Roger A. Williams, Redford, all of Mich.

[73] Assignee: Eaton Corporation, Cleveland, Ohio

[21] Appl. No.: 74,627

[22] Filed: Jun. 10, 1993

[51] Int. Cl.⁶ .............................................. B60K 41/28
[52] U.S. Cl. ...................................... 477/86; 192/3.62
[58] Field of Search ................ 192/0.076, 0.052, 3.62; 477/86, 70, 77

[56] References Cited

U.S. PATENT DOCUMENTS

| | | | |
|---|---|---|---|
| 2,341,631 | 2/1944 | Leukhardt | 192/0.052 |
| 2,566,631 | 9/1951 | Price | 192/0.076 |
| 3,273,679 | 9/1966 | Uher | 192/0.076 X |
| 3,379,291 | 4/1968 | Randol | 192/0.052 |
| 4,061,217 | 12/1977 | Toyota et al. | 192/0.052 |
| 4,081,065 | 3/1978 | Smyth et al. | 192/0.076 |
| 4,295,551 | 10/1981 | Zimmermann et al. | 192/0.076 |
| 4,361,060 | 11/1982 | Smyth | 74/866 |
| 4,585,107 | 4/1986 | Leigh-Monstevens | 192/85 |
| 4,638,898 | 1/1987 | Braun | 192/0.052 |
| 4,723,642 | 2/1988 | Grunberg et al. | 192/3.62 X |
| 4,779,713 | 10/1988 | Tomala et al. | 192/88 |
| 4,828,093 | 5/1989 | Bertin et al. | 192/90 |
| 4,874,070 | 11/1989 | Nellums et al. | 192/0.052 |
| 4,979,366 | 12/1990 | Compton et al. | |
| 5,002,166 | 3/1991 | Leigh-Monstevens et al. | 192/3.62 X |

FOREIGN PATENT DOCUMENTS 2204657 11/1988 United Kingdom .
2212238 7/1989 United Kingdom .

Primary Examiner—Rodney H. Bonck
Attorney, Agent, or Firm—Howard D. Gordon

[57] ABSTRACT

A master clutch control system/method for controlling engagement and disengagement of a vehicular master clutch, preferably a multiple disc wet clutch (14) is provided. Below a reference vehicle speed (OS<REF$_{OS}$) and/or a reference engine speed (ES<REF$_{ES}$), the clutch is automatically controlled as a function of throttle displacement (THL) while above the reference vehicle speed (OS>REF$_{OS}$) and/or reference engine speed (ES>REF$_{ES}$) the clutch is controlled as a function of the position of a manual engage/disengage switch (50) biased to the engage selection position thereof.

34 Claims, 3 Drawing Sheets

CLUTCH CONTROL

BACKGROUND OF THE INVENTION

1. Field of the Invention

The present invention relates to a control system/method for controlling the operation of a vehicular master clutch, preferably a wet clutch, utilized in connection with a change gear transmission, preferably a manually shifted mechanical change gear transmission. In particular, the present invention relates to a vehicular master clutch control system/method wherein, if vehicle and/or engine speed are below reference values, then clutch position is automatically controlled as a function of throttle pedal displacement, and, if vehicle and/or engine speed are above the reference values, then the clutch is controlled by a manually operated clutch engage/disengage switch, such as a two-position button or lever on the gear shift knob, regardless of the throttle pedal position.

2. Description of the Prior Art

Automated mechanical transmission systems, and automated master clutch control systems therefor, are known in the prior art as may be seen by reference to U.S. Pat. Nos. 4,081,065; 4,361,060 and 4,638,898, the disclosures of which are incorporated herein by reference. Typically, these fully automated systems had various sensors for sensing and providing signals indicative of engine speed (ES), input shaft speed (IS), output shaft speed (OS) and/or throttle position (THL) to a microprocessor based electronic control unit (ECU) which processed the inputs according to predetermined logic rules to issue command output signals to various system actuators such as an engine fuel control, a transmission actuator and/or a clutch actuator. Typically, during start from stop operation, a desired engine speed was calculated as a function of throttle position and compared to actual engine speed to determine if modulation of the clutch was required.

Automated clutch actuators for use with manual transmissions are known in the prior art, see for example, U.S. Pat. Nos. 4,508,625 and 4,828,093, the disclosures of which are incorporated herein by reference. The devices, often referred to as "autoclutches", provide automated start from stop clutch operation and sensed when a manual shift was initiated and completed to provide a relatively unmodulated master clutch disengagement and then reengagement.

While the prior art vehicular master clutch controls are well suited for many uses, they were not satisfactory for all purposes as they were overly complicated and/or expensive for some systems, they did not allow manual clutch engagement/disengagement when shifting on the fly and/or they were not well suited for multiple disc wet clutches.

SUMMARY OF THE INVENTION

In accordance with the present invention, the drawbacks of the prior art are minimized or overcome by the provision of a clutch control system/method for a vehicular master clutch which senses throttle pedal position (THL), engine (ES) and/or vehicle speed (OS) and the position of a manual clutch engage/disengage switch (MC) and controls the operation of the master clutch as a function thereof.

Briefly, below a predetermined vehicle and/or engine speed, the state of engagement of the master clutch is controlled, in a modulated manner, as a function of the operator's displacement of the throttle pedal while above the predetermined vehicle and/or engine speeds, the clutch is moved in a rapid nonmodulated manner between fully disengaged or fully engaged positions (i.e. full clamp load on clutch) responsive to the manual positioning of clutch switch, such as a two-position button on the shift lever knob.

Accordingly, it is all object of the present invention to provide a new and improved master clutch control system/method which provides modulated clutch engagement/disengagement as a function of throttle position for start from stop operation and, at running speeds, provides a simple engage/disengage control responsive to a manually operated switch.

This, and other objects and advantages of the present invention, will become apparent from a reading of the description of the preferred embodiment taken in connection with the drawings.

DESCRIPTION OF THE PREFERRED EMBODIMENT

Figure 1:
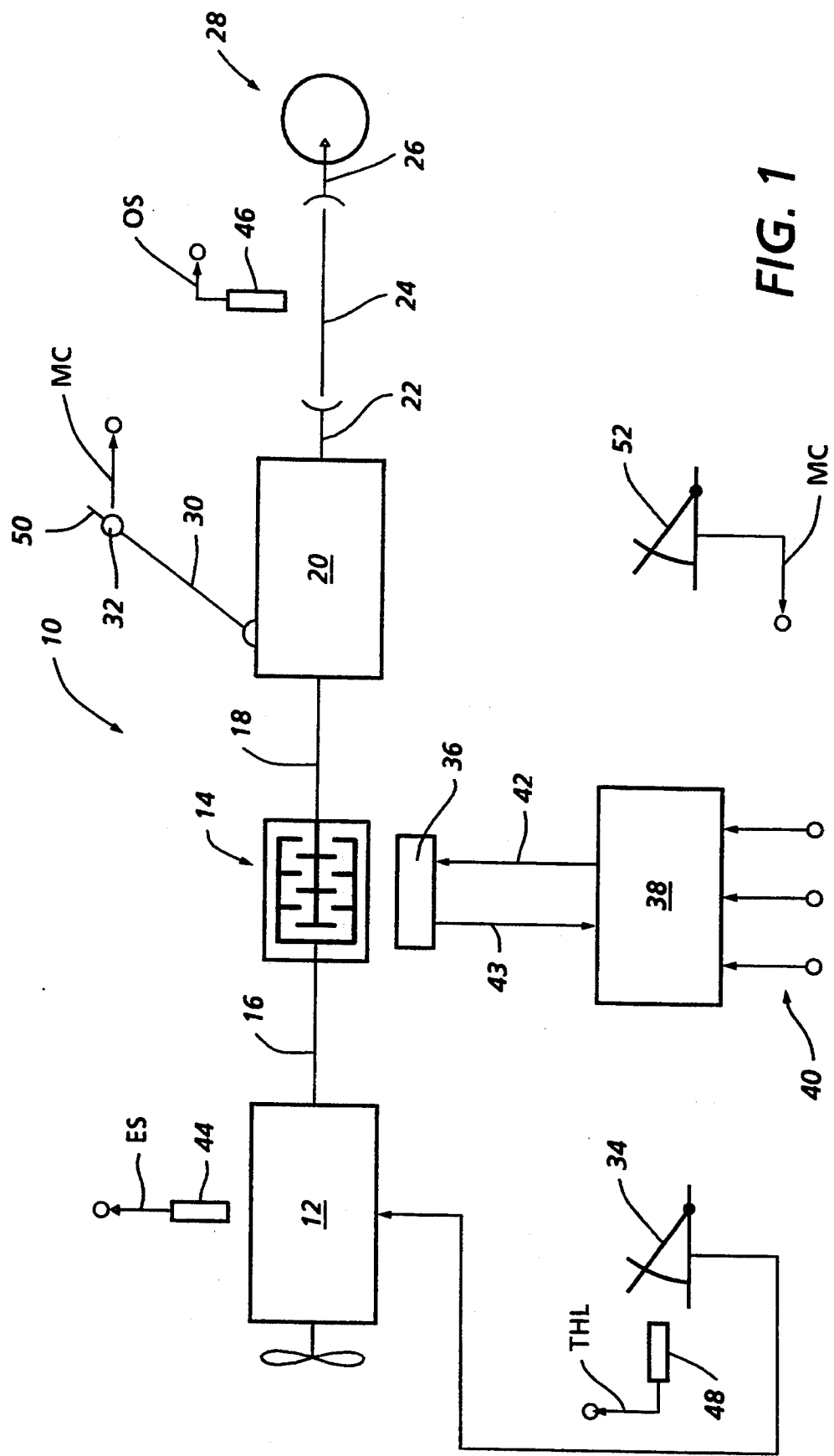
FIG. 1 is a schematic illustration of a vehicular power train using the clutch control system/method of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Increased or greater engagement of the master clutch will refer to movement of the clutch from fully disengaged to touch point to increased clamping load on the clutch friction surfaces. Said terminology will include the words above specifically mentioned, derivatives thereof and words of similar import.

A schematic representation of a vehicular power train 10 is illustrated in FIG. 1. The vehicular power train 10 includes a fuel throttle controlled engine 12, such as a well known diesel engine, a selectively engaged and disengaged master friction clutch 14 drivingly interposed the engine crankshaft 16 and the input shaft 18 of a mechanical change gear transmission 20. Transmission 20 has an output shaft 22 connected by a prop shaft (drive shaft) 24 to the input/pinion shaft 26 of a rear drive axle 28.

Mechanical change gear transmission 20 may be of a simple or compound design and may use synchronized, blocked or nonsynchronized jaw clutches to engage selected gear ratios. Transmissions of these types are well known in the prior art as may be seen by reference to U.S. Pat. Nos. 4,373,403; 4,388,838 and 4,735,109, the disclosures of all of which are incorporated herein by reference. Transmission 20 is manually shifted by a shift lever 30 having a shift lever knob 32 on the free end thereof.

The supply of fuel to the engine 12 is controlled, at least in part, by a throttle pedal 34 displaceable from a zero throttle position (THL=0%) wherein only idle fuel is supplied to engine 12 to a fully displaced position (THL=100%) where in maximum fueling of the engine is requested. An over travel ("kick down") position may also be provided in certain automated systems for requesting enhanced performance of the power train.

The master clutch 14 is preferably a wet clutch spring biased to a normally disengaged position and is of the multiple wet disc pack type. The clutch is operated, i.e. engaged and disengaged, by a clutch actuator 36 which is preferably of the hydraulic, electric and/or pneumatic type. Clutch actuators are well known in the prior art as may be seen by reference to U.S. Pat. Nos. 4,828,093; 4,585,107 and 4,779,713, the disclosures of which are incorporated herein by reference, and to GB 2,204,657. A clutch controller 38 receives various analog and/or digital input signals 40 and processes same according to predetermined logic rules to issue a mechanical, electrical, pneumatic and/or hydraulic command signal 42 to the actuator. By way of example, if master clutch 14 is spring biased to the closed or engaged position and if actuator 36 is hydraulically operated, signal 42 may be the pressurization or exhaust of one or more conduits leading to the chamber(s) of a piston/cylinder actuator. Actuator 36 open or disengaged may provide a feedback signal 43 indicative of clutch position, see the disclosure of U.S. Pat. Nos. 4,621,565 and 4,646,891, both incorporated herein by reference.

A sensor 44 is provided for sensing engine speed and for providing a signal ES indicative thereof. A sensor 46 is provided for sensing output shaft speed and for providing a signal OS indicative thereof. With a known drive axle ratio, the value of signal OS is, as is well known, indicative of vehicle speed. A sensor 48 is provided for sensing throttle pedal position (i.e. percent of throttle pedal displacement) and for providing a signal THL indicative thereof. Sensor 48 preferably provides an electrical THL signal and is of a potentiometer/rheostat type. As may be seen by reference to FIG. 3, a secondary sensor or limit switch 48A may be provided to signal displacement of the throttle pedal from the nondisplaced engine idle position (0% displacement) to at least a predetermined position (lock-up % displacement) which may be less than 100% throttle displacement.

An operator actuated switch, preferably a two-position switch, is provided for allowing the operator to manually select full disengagement of the master clutch. In the preferred embodiment, a button 50 is provided on shift knob 32 which is biased to a first position wherein the master clutch disengagement is not selected and is resiliently displaceable to a second position wherein master clutch disengagement is selected. Selector switch 50 will provide a signal MC indicative of the current selection of the first position (MC=0) or second position (MC=1) of the switch.

In an alternate embodiment, a "clutch pedal" 52 is provided in the vehicle to provide the MC signal or, in a further alternate design, to allow the operator to override all other controls and manually operate the clutch, see Published European Patent Application EP 0,231,465A.

Figure 2:
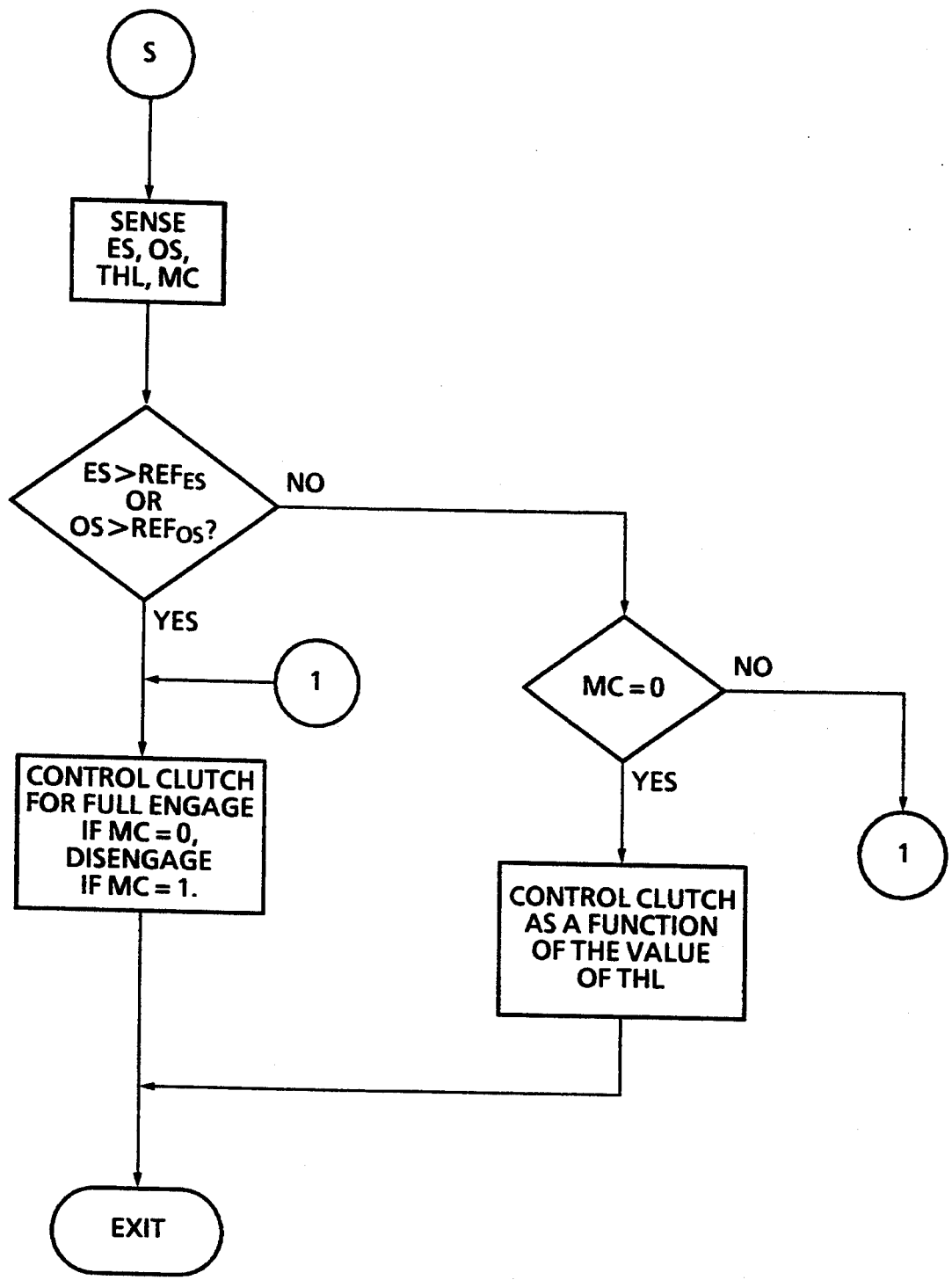
FIG. 2 is a schematic illustration, in flow chart format, of the vehicular master clutch control system/method of the present invention.

In operation, see the flow chart of FIG. 2, the control system of the present invention is effective to provide modulated start from stop clutch engagement as a function of throttle pedal position until a predetermined vehicle speed is reached, $OS > REF_{OS}$, at which point the master clutch is fully engaged (full clamping forces applied) and further clutch engagement/disengagement, primarily for shifting transmission 20, is controlled by operator manipulation of switch 50.

Preferably, to allow proper operation of the clutch control system for situations when the vehicle is heavily loaded and also when the vehicle is lightly loaded, the engine speed ES will be compared to a reference value $REF_{ES}$, and, if the engine speed exceeds the reference, this indicates that engine can provide more than the necessary torque, a situation usually associated with a lightly loaded vehicle or vehicle not experiencing a high resistance to motion, then the clutch is fully engaged and further engagement/disengagement is by manual operation of button/switch 50.

The THL signal may have a value less than 100% displacement, i.e. the lockup percentage of displacement, at which the master clutch is caused to be fully engaged and thereafter controlled solely by switch 50. Limit switch 48A to sense the lockup throttle pedal displacement is useful but not required.

For a typical heavy duty truck using a diesel engine having a 600 RPM idle speed and a 2100 RPM governed speed, the $REF_{OS}$ corresponds to OS at about 5 MPH (8 KMPH) vehicle speed and $REF_{ES}$ is about 1055 RPM in second gear of 13-speed transmission and may vary with the value THL. The lockup percentage of throttle displacement may be about 80% of full throttle displacement.

Figure 3:
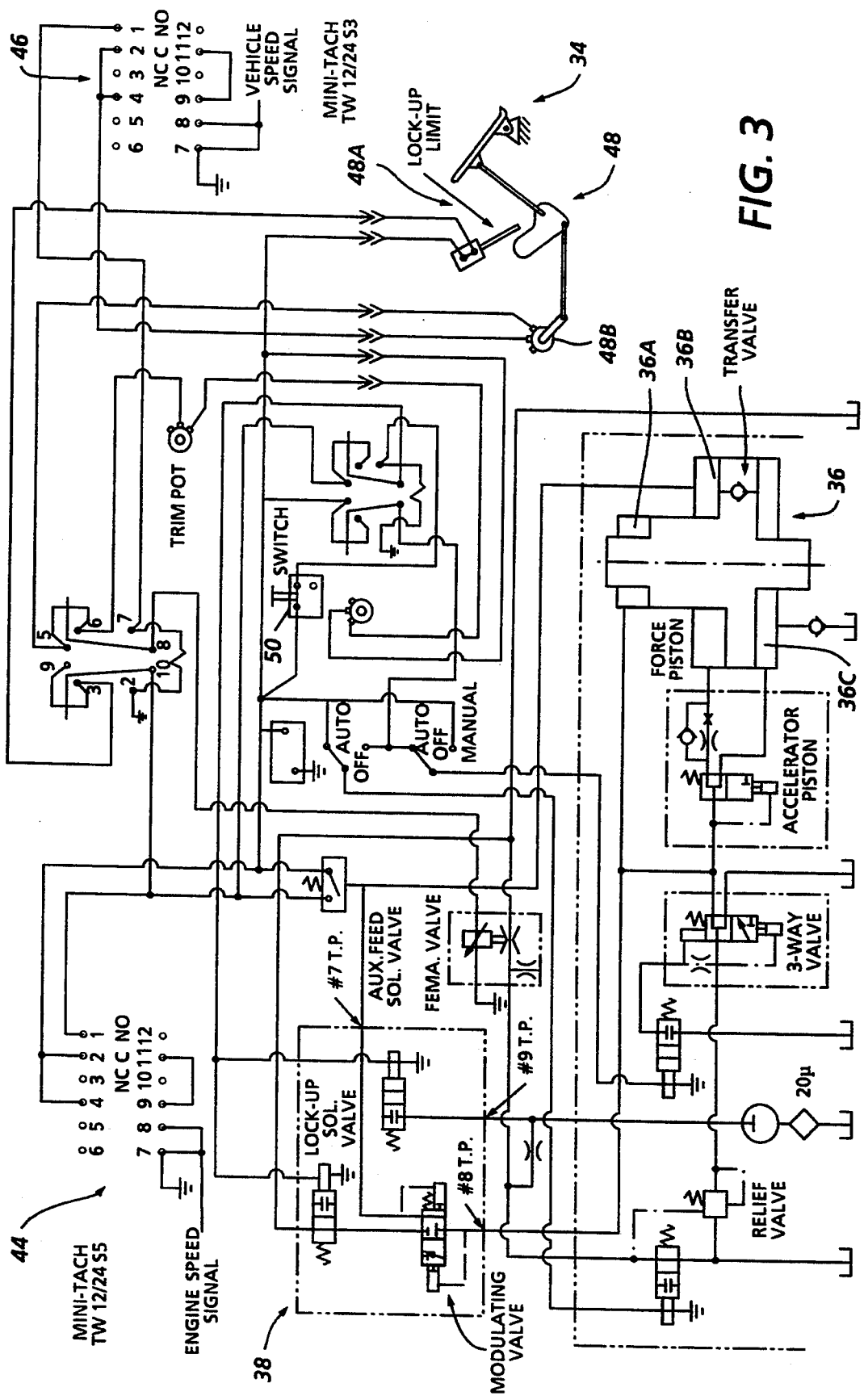
FIG. 3 is a schematic illustration of an electric/hydraulic control circuit for implementing the present invention.

An electrically controlled/hydraulically operated master clutch control according to the present invention is schematically illustrated in FIG. 3. As may be seen, displacement of the throttle pedal 34 will cause the potentiometer 48B of sensor 48 to provide a signal indicative of the amount of displacement of the throttle pedal while limit switch 48A will provide a signal when displacement of the throttle equals or exceeds the lockup percentage (80%).

Actuator 36 is a hydraulic piston/cylinder assembly which is caused to move downwardly through travel phase by pressurizing chamber 36A to approximately 60 psi. The downward movement causes chamber 36B to expand and chamber 36C to contract. A relative large fluid volume is efficiently transferred between these chambers and the clutch is brought to "touch point" by controlling a relatively smaller amount of oil in chamber 36B. Controller 38 modulates the pressure in chamber 36B to a level 60 psi below chamber 36A until full lock-up is commanded. Opposed chamber 36C serves as a balance chamber to cancel centrifugal force reaction on the actuator as well as being a reservoir for transfer oil.

The FEMA valve 38A will provide pressurized fluid inversely proportional to the control current applied thereto. The FEMA valve is, for example, a Model No. 86140 valve provided by the FEMA Company of Portage, Mich.

Accordingly, it may be seen that a relatively simple and inexpensive clutch control for controlling a vehicular master clutch utilized with a manually shifted mechanical transmission and providing automated modulated clutch engagement during start from stop operation and allowing easy manual clutch engagement/disengagement during running shifting operations is provided.

Although this invention has been described in its preferred form with a certain degree of particularity, it is understood that present disclosure of the preferred form is for descriptive purposes only and that various modifications and changes in the detailed construction and arrangement of the parts may be resorted to without departing from the spirit and the scope of the invention as claimed.

We claim:

1. A method for controlling engagement and disengagement of a vehicular master clutch (14) drivingly interposed between an engine (12) controlled by a manual throttle (34) and a manually shifted multiple speed mechanical transmission (20), said throttle having a nondisplaced position wherein a minimum amount of fuel is supplied to the engine and being substantially continuously displaceable to a one hundred percent (100%) displaced position wherein maximum fueling of the engine is requested, said method comprising:

providing a clutch actuator (36) responsive to signals from a controller (38) to engage and disengage the master clutch;

providing a manually operated selection device (50/52) allowing manual selection of engagement and disengagement of said master clutch, said device biased to a position of selection of engagement of said master clutch and displaceable to a position of selection of disengagement of said master clutch;

sensing a value (OS) indicative of vehicle speed;

sensing a value (THL) indicative of throttle displacement;

comparing the value indicative of vehicle speed to a first reference value (REF$_{OS}$); and if the value indicative of vehicle speed is less than said first reference value (OS<REF$_{OS}$), then, if said manually operated selection device is in the disengagement selection position, causing said actuator to disengage said master clutch and, if the manually operated section device is in the position of selection of engagement, causing said master clutch to automatically engage in a modulated manner as a function of the value of the signal indicative of throttle displacement, the greater the throttle displacement, the greater the engagement of the master clutch, and, if said signal indicative of vehicle speed exceeds said first reference value (OS>REF$_{OS}$), then causing said master clutch to engage and disengage as selected by said selection device regardless of the value of the signal indicative of throttle displacement.

2. The method of claim 1 wherein said switch is a two-position selection device.

3. The method of claim 2 wherein if the value of said signal indicative of vehicle speed exceeds said first reference value (OS>REF$_{OS}$), said controller responds to said selection device in the position of selection of engagement (MC=0) by causing said master clutch to move rapidly to or remain in the fully engaged position thereof and responds to said selection device in the position of selection of disengagement (MC=1) by causing said master clutch to move rapidly to or remain in the fully disengaged position thereof.

4. The method of claims 1, 2 or 3 wherein, at a predetermined throttle displacement (lockout %) less than 100% displacement, the controller will cause the master clutch to be fully engaged if the selection device is in the position of selection of engagement.

5. The method of claim 4 wherein said predetermined throttle displacement is about 80% displacement.

6. The method of claims 1 or 2 further comprising:

sensing a value (ES) indicative of engine speed;

comparing the value of the signal indicative of engine speed to a second reference value (REF$_{ES}$); and if the value of the signal indicative of engine speed exceeds said second reference value (ES>REF$_{ES}$), then causing said master clutch to engage and disengage as requested by said selection device regardless of the value of the signal indicative of throttle displacement.

7. The method of claim 6 wherein if said signal indicative of vehicle speed exceeds said first reference value (OS>REF$_{OS}$) or said signal indicative of engine speed exceeds said second reference value (ES>REF$_{ES}$), said controller responds to said selection device in the position of selection of engagement (MC=0) by causing said master clutch to move rapidly to or remain in the fully engaged position thereof and responds to said selection device in the position of selection of disengagement (MC=1) by causing said master clutch to move rapidly to or remain in the fully disengaged position thereof.

8. The method of claim 6 wherein, at a throttle displacement (lockout %) less than 100% displacement, the controller will cause the master clutch to be fully engaged if the selection device is in the engaged position thereof.

9. The method of claim 7 wherein, at a throttle displacement (lockout %) less than 100% displacement, the controller will cause the master clutch to be fully engaged if the selection device is in the engaged position thereof.

10. The method of claim 6 wherein said predetermined throttle displacement is about 80% displacement.

11. The method of claim 7 wherein said predetermined throttle displacement is about 80% displacement.

12. The method of claims 1, 2 or 3 wherein said first reference value corresponds to a vehicle speed of about 5 MPH (8 KMPH).

13. The method of claim 7 wherein said first reference value corresponds to a vehicle speed of about 5 MPH (8 KMPH).

14. The method of claims 1, 2 or 3 wherein said second reference value, for a diesel engine governed to a speed of about 2100 RPM, is about 1000 to 1200 RPM.

15. The method of claim 7 wherein said second reference value, for a diesel engine governed to a speed of about 2100 RPM, is about 1000 to 1200 RPM.

16. The method of claims 2 or 3 wherein said transmission includes a manual shift lever (30) having a shift knob (32), said selection device (50) mounted on said knob.

17. The method of claim 7 wherein said transmission includes a manual shift lever (30) having a shift knob (32), said selection device (50) mounted on said knob.

18. A control system for controlling engagement and disengagement of a vehicular master clutch (14) drivingly interposed between an engine (12) controlled by a manual throttle (34) and a manually shifted multiple speed mechanical transmission (20), said throttle having a nondisplaced position wherein a minimum amount of fuel is supplied to the engine and being substantially continuously displaceable to a one hundred percent (100%) displaced position wherein maximum fueling of the engine is requested, said control system comprising:

a clutch actuator (36) responsive to signals from a controller (38) to engage and disengage the master clutch;

a manually operated selection device (50/52) allowing manual selection of engagement and disengagement of said master clutch, said device biased to a position of selection of engagement of said master clutch and displaceable to a position of selection of disengagement of said master clutch;

a first sensor (46) for sensing a value (OS) indicative of vehicle speed;

a second sensor (48) for sensing a value (THL) indicative of throttle displacement;

said controller (38) effective to compare the value indicative of vehicle speed to a first reference value ($REF_{OS}$); and if the value indicative of vehicle speed is less than said first reference value ($OS < REF_{OS}$), then, if said manually operated selection device is in the disengagement selection position, causing said actuator to disengage said master clutch and, if the manually operated section device is in the position of selection of engagement, causing said master clutch to automatically engage in a modulated manner as a function of the value of the signal indicative of throttle displacement, the greater the throttle displacement, the greater the engagement of the master clutch, and, if said signal indicative of vehicle speed exceeds said first reference value ($OS > REF_{OS}$), then causing said master clutch to engage and disengage as selected by said selection device regardless of the value of the signal indicative of throttle displacement.

19. The system of claim 18 wherein said selection device is a two-position switch.

20. The system of claim 19 wherein if the value of said signal indicative of vehicle speed exceeds said first reference value ($OS > REF_{OS}$), said controller responds to said selection device in the position of selection of engagement (MC=0) by causing said master clutch to move rapidly to or remain in the fully engaged position thereof and responds to said selection device in the position of selection of disengagement (MC=1) by causing said master clutch to move rapidly to or remain in the fully disengaged position thereof.

21. The system of claims 18, 19 or 20 wherein, at a predetermined throttle displacement (lockout %) less than 100% displacement, the controller will cause the master clutch to be fully engaged if the selection device is in the position of selection of engagement.

22. The system of claim 21 wherein said predetermined throttle displacement is about 80% throttle displacement.

23. The system of claims 18 or 19 further comprising:

a third sensor (44) for sensing a value (ES) indicative of engine speed;

and said controller is further effective to compare the value of the signal indicative of engine speed to a second reference value ($REF_{ES}$); and if the value of the signal indicative of engine speed exceeds said second reference value ($ES > REF_{ES}$), then causing said master clutch to engage and disengage as requested by said selection device regardless of the value of the signal indicative of throttle displacement.

24. The system of claim 23 wherein if said signal indicative of vehicle speed exceeds said first reference value ($OS > REF_{OS}$) or said signal indicative of engine speed exceeds said second reference value ($ES > REF_{ES}$), said controller responds to said selection device in the position of selection of engagement (MC=0) by causing said master clutch to move rapidly to or remain in the fully engaged position thereof and responds to said selection device in the position of selection of disengagement (MC=1) by causing said master clutch to move rapidly to or remain in the fully disengaged position thereof.

25. The system of claim 23 wherein, at a predetermined throttle displacement (lockout %) less than 100% displacement, the controller will cause the master clutch to be fully engaged if the selection device is in the engaged position thereof.

26. The system of claim 24 wherein, at a predetermined throttle displacement (lockout %) less than 100% displacement, the controller will cause the master clutch to be fully engaged if the selection device is in the engaged position thereof.

27. The system of claims 18, 19 or 20 wherein said first reference value corresponds to a vehicle speed of about 5 MPH (8 KMPH).

28. The system of claim 23 wherein said first reference value corresponds to a vehicle speed of about 5 MPH (8 KMPH).

29. The system of claims 18, 19 or 20 wherein said second reference value, for a diesel engine governed to a speed of about 2100 RPM, is about 1000 to 1200 RPM.

30. The system of claim 23 wherein said second reference value, for a diesel engine governed to a speed of about 2100 RPM, is about 1000 to 1200 RPM.

31. The system of claims 18 or 19 wherein said selection device is adapted for mounting on a manual shift lever shift knob (32).

32. The system of claim 24 wherein said selection device is adapted for mounting on a manual shift lever shift knob (32).

33. The system of claims 18, 19 or 20 wherein said system is for controlling the engagement and disengagement of clutches constantly biased to the disengaged position thereof.

34. The system of claim 33 wherein said system is for controlling engagement and disengagement of multiple disc wet clutches.

* * * * *